US006993123B1

(12) United States Patent
Allen et al.

(10) Patent No.: US 6,993,123 B1
(45) Date of Patent: Jan. 31, 2006

(54) INTELLIGENT ACCESS CONTROL SYSTEM

(75) Inventors: Joseph Allen, New York, NY (US); Douglas R. Jones, Philadelphia, PA (US); Daniel J. O'Callaghan, Reston, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/523,267

(22) Filed: Mar. 10, 2000

(51) Int. Cl.
*H04M 3/42* (2006.01)

(52) U.S. Cl. ............. 379/215.01; 379/159; 379/167.05

(58) Field of Classification Search ................ 379/159, 379/160, 167.01, 167.02, 167.03, 167.04, 379/167.05, 88.18, 215.01, 156, 164, 165, 379/167.11, 171
See application file for complete search history.

(56) References Cited

U.S. PATENT DOCUMENTS

| | | | | |
|---|---|---|---|---|
| 3,484,561 A | * | 12/1969 | Matthews ............... | 379/102.06 |
| 3,557,318 A | * | 1/1971 | Buonsante et al. ......... | 379/157 |
| 3,816,662 A | * | 6/1974 | Shaver et al. ............ | 348/14.11 |
| 3,947,641 A | * | 3/1976 | Trell ........................ | 348/14.01 |
| 4,035,588 A | * | 7/1977 | Marshall et al. ............ | 379/159 |
| 4,113,986 A | * | 9/1978 | Clement et al. ....... | 379/102.06 |
| 4,715,060 A | * | 12/1987 | Lipscher et al. ............... | 379/70 |
| 4,764,953 A | * | 8/1988 | Chern et al. ........... | 379/355.01 |
| 4,819,262 A | * | 4/1989 | Brittain et al. .............. | 379/157 |
| 4,868,540 A | * | 9/1989 | Housley ..................... | 340/326 |
| 4,937,855 A | * | 6/1990 | McNab et al. ......... | 379/102.06 |
| 5,022,069 A | * | 6/1991 | Chen ......................... | 379/67.1 |
| 5,315,644 A | * | 5/1994 | Lester et al. ........... | 379/102.07 |
| 5,428,388 A | * | 6/1995 | von Bauer et al. ......... | 348/155 |
| 5,537,465 A | * | 7/1996 | Bellafiore ................... | 379/157 |
| 5,570,083 A | * | 10/1996 | Johnson ..................... | 340/692 |
| 5,673,016 A | * | 9/1997 | Lutes ......................... | 340/326 |
| 5,680,447 A | * | 10/1997 | Diamond et al. ...... | 379/215.01 |
| 5,825,867 A | * | 10/1998 | Epler et al. ............ | 379/215.01 |
| 6,160,877 A | * | 12/2000 | Tatchell et al. ............. | 379/197 |
| 6,415,026 B1 | * | 7/2002 | Flood .................... | 379/215.01 |
| 6,477,248 B1 | * | 11/2002 | Bruhnke et al. ........ | 379/399.01 |
| 6,519,335 B1 | * | 2/2003 | Bushnell ................ | 379/215.01 |
| 6,603,848 B1 | * | 8/2003 | Winnett .................. | 379/215.01 |

* cited by examiner

*Primary Examiner*—Bing Q. Bui
(74) *Attorney, Agent, or Firm*—Leonard C. Suchyta, Esq.; Rader, Fishman & Grauer LLP

(57) ABSTRACT

In operational environments where local loop generation equipment is used, communication interruptions between a central office and a customer premises device is minimized by using a dedicated communications link between the local loop generation equipment and the central office. A processing mechanism at the central office determines if, when, and under what circumstances the customer premises device will be notified in response to the activation of local loop generation equipment. This eliminates the need to place local loop generation equipment in series with a communications path that runs between the central office and the customer premises. The central office may provide the dedicated communications link in the form of a telephone line which is equipped to place outgoing local calls, but not equipped to receive incoming calls, and not equipped to place long-distance calls.

27 Claims, 9 Drawing Sheets

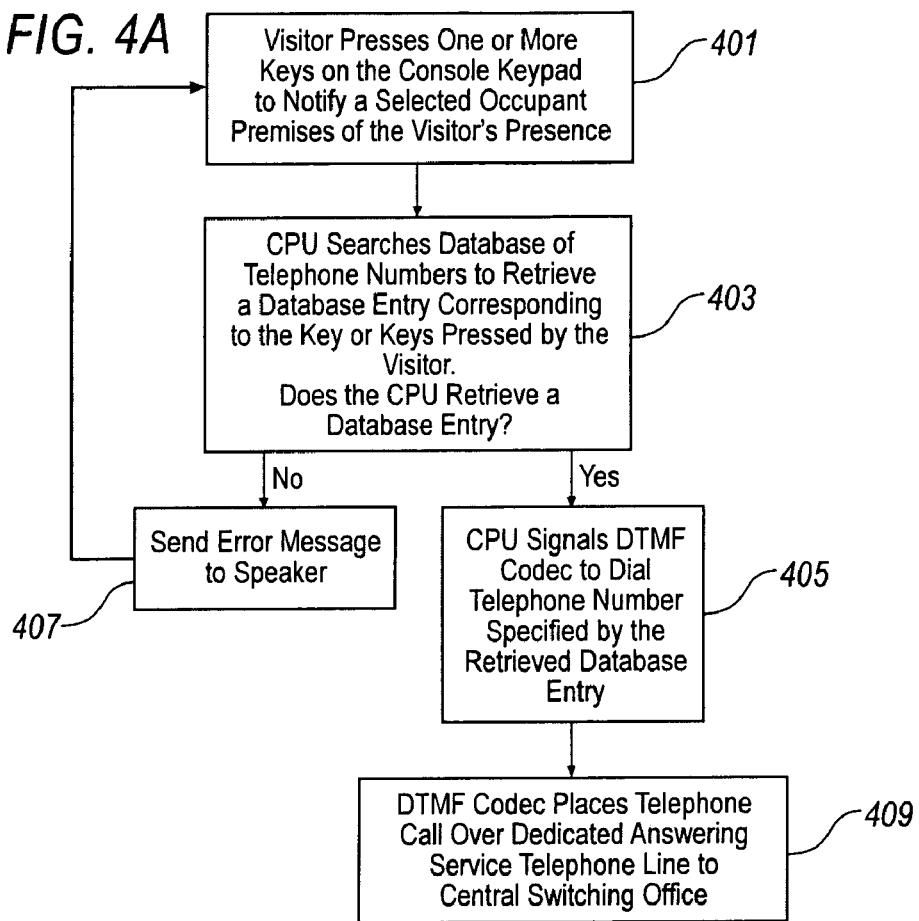
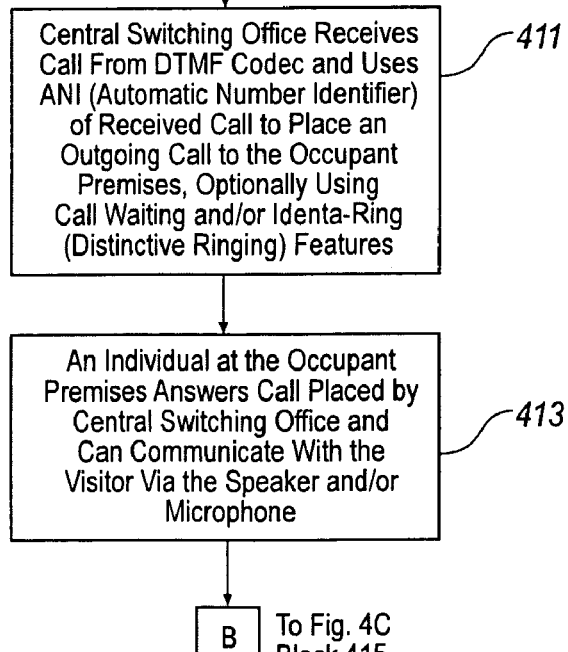

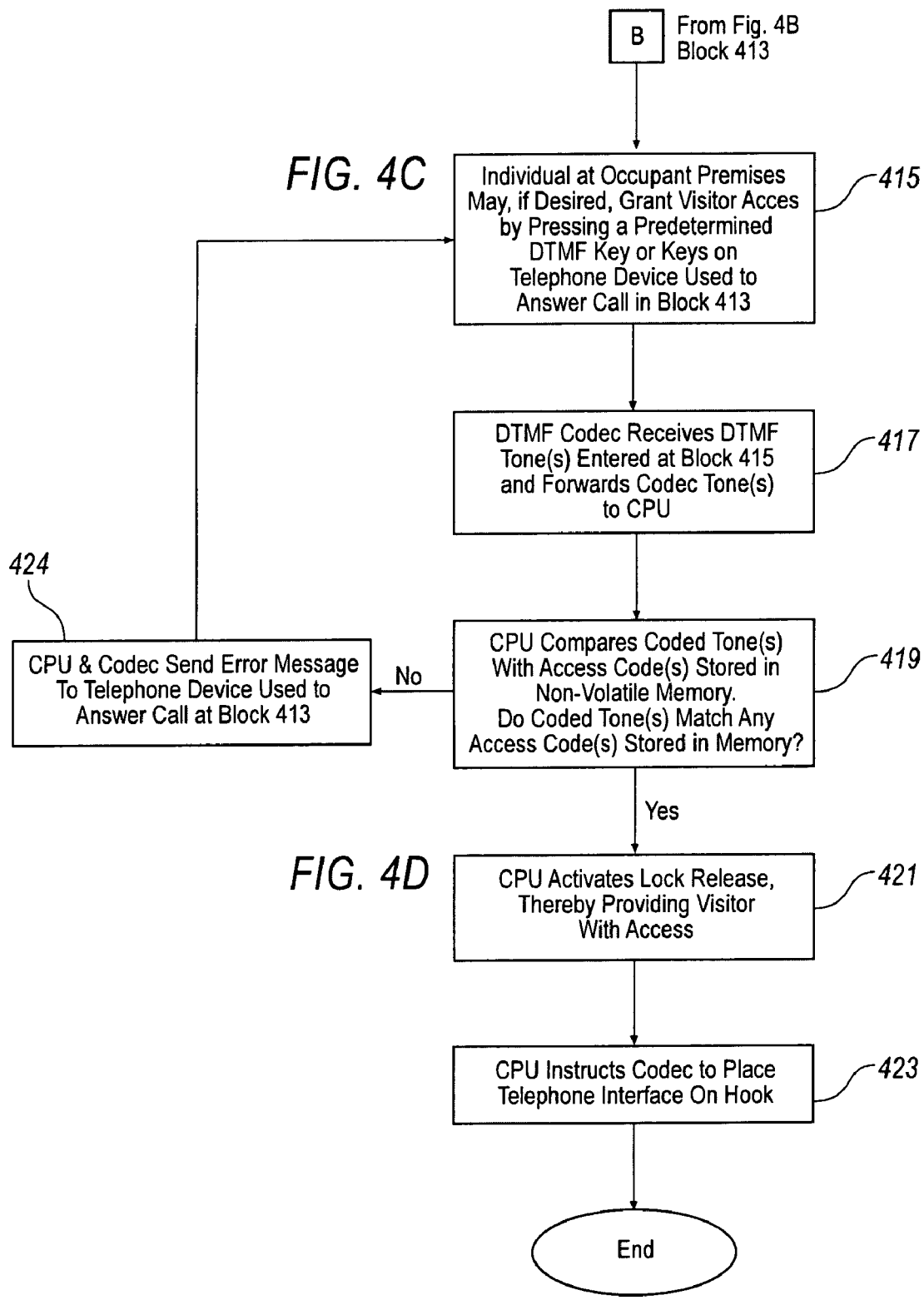

INTELLIGENT ACCESS CONTROL SYSTEM

FIELD OF THE INVENTION

The present invention relates generally to telephonic communications, and, more particularly, to techniques for overcoming shortcomings of local loop generation equipment.

BACKGROUND OF THE INVENTION

Ever-increasing numbers of telephone customers may be coupled to local loop generation equipment, examples of which are security systems, doorbell answering devices, and access control mechanisms. In particular, doorbell answering systems are commonly utilized in multi-family housing units. These systems generally place a switching mechanism in series with the tip/ring lines running from the telephone company central switching office to the customer premises. Normally, this switching mechanism is closed, completing a circuit between the switching office and the customer premises. In this closed state, customers are able to communicate voice and/or data over their telephone lines as if the access control system was not even present. However, this communication is subject to interruption at any time. When a visitor wishes to notify a person at a selected customer premises of his or her presence, the visitor pushes a button, or presses one or more keys on a keypad. The access control system responds to the button or key presses by opening up the circuit between the customer and the central switching office, and by providing a local loop between the visitor and the selected customer premises.

This open circuit is something of a nuisance if it interrupts a voice call already in progress. However, the open circuit is also problematic in cases where the transfer of data is interrupted. For example, many people use a computer modem to access the Internet over conventional telephone lines. Once the circuit between the central office (CO) and the computer modem is broken, the modem will disconnect from the telephone line. The subscriber loses data during this interruption, and may also be faced with the inconvenience of having to re-log into an online service.

The circuit between the central office and the customer is broken so that a local loop may be provided between the customer premises and an access door. After the circuit has been broken, the door answering system then feeds a ringing signal to the telephone line serving the subscriber's premises. When a person at the customer premises takes a telephone off-hook, voice communications are now enabled between this person and the visitor. If this person wishes to grant the visitor access, this person presses a specified DTMF tone sequence on the telephone keypad or, alternatively, presses a lock release button separate and apart from the telephone system to grant the visitor access.

Although the foregoing example deals with local loop generation equipment in the form of a doorbell answering system, other types of local loop generation equipment present similar problems. Whenever the local loop generation equipment creates a local loop, voice and data communications between the customer and the central office are interrupted.

Refer to FIG. 1, which is a hardware block diagram of an illustrative prior art access control system. This access control system places intercom equipment 105 in series between central office 101 and housing unit 103. For the sake of clarity, FIG. 1 shows only one housing unit 103, whereas, in a more typical application, intercom equipment 105 would be placed in series between tip/ring wire pairs running from the central office 101 to each of a plurality of housing units. Tip/ring lines 115, 117 from central office 101 are coupled to a switching mechanism 107 in intercom equipment 105. Switching mechanism 107 selectively switches tip/ring lines 115, 117 to tip/ring lines 119, 121 serving housing unit 103. Normally, switching mechanism 107 is closed, completing a circuit between the switching office and the customer premises by coupling tip line 115 to tip line 119, and ring line 117 to ring line 121. In this manner, customers are now able to place outgoing calls, and also to receive incoming calls, as if the intercom equipment 105 was not even present.

When a visitor wishes to notify a person at a selected housing unit 103 of his or her presence, the visitor pushes a button, or presses one or more keys on a keypad at a lobby interface device 111. In response to the receipt of these keypress signals at switching mechanism 107, microprocessor 109 activates switching mechanism 107 to break the connection between central office 101 and housing unit 103, and to connect housing unit 103 to lobby interface device 111, thereby forming a local loop between lobby interface device 111 and housing unit 103. More specifically, switching mechanism 107 opens up the circuit between tip line 115 and tip line 119, and also between ring line 117 and ring line 121, and closes the circuit between tip line 119 and tip line 123, as well as ring line 121 and ring line 125. The keypress signals are sent out over tip/ring lines 123, 125 which form the local loop between the lobby interface device 111 and the switching mechanism 107. The keypress signals could, but need not, be DTMF signals or pulse dialing signals.

The switching mechanism 107 forwards these keypress signals to microprocessor 109, which responds to the button or key presses by activating switching mechanism 107. The intercom equipment 105 then feeds a ringing signal, via switching mechanism 107, to a telephone at housing unit 103. When a person at housing unit 103 takes the telephone off-hook, voice communications are now enabled between this person and the visitor. If this person wishes to grant the visitor access, this person presses a specified DTMF tone sequence on the telephone keypad or, alternatively, presses a lock release button separate and apart from the telephone system to grant the visitor access.

Unfortunately, whenever a visitor activates the lobby interface device 111 to signal a resident, the resident may already be in data and/or voice communication with central office 101. If, for example, the resident is communicating over the Internet, the Internet connection will typically be lost. These breaks in communication may occur unexpectedly, unpredictably, and repeatedly, causing the resident to become frustrated with the overall quality of telephone service.

SUMMARY OF THE INVENTION

In view of the foregoing deficiencies of the prior art, it is an object of the invention to minimize the interruption of communications between a central office and a customer premises when local loop generation equipment is in use.

It is a further object of the invention to intelligently control any interruption of communications over a telephone line between a central office and one or more customer premises devices caused by the activation of local loop generation equipment on this telephone line.

It is a still further object of the invention to allow a premises occupant to receive doorbell answering system telephone calls while already engaged in another telephone call.

It is a still further object of the invention to provide a premises occupant with a cancel door bell call waiting feature such that call waiting tones will not be sent to the premises telephone when a visitor activates the doorbell answering system and a call is already in progress.

It is a still further object of the invention to provide a premises occupant with a call waiting feature such that only calls from the doorbell answering system will cause call waiting tones to be sent to the premises telephone.

In accordance with the objects of the invention, any interruption of communications between a central office and a customer premises device is minimized by using a dedicated communications link between the local loop generation equipment and the central office. A processing mechanism at the central office determines if, when, and under what circumstances the customer premises device will be notified in response to the activation of local loop generation equipment. This eliminates the need to place local loop generation equipment in series with a communications path that runs between the central office and the customer premises.

According to a further embodiment, the central office provides the dedicated communications link in the form of a telephone line which is equipped to place outgoing local calls, but not equipped to receive incoming calls, and not equipped to place long-distance calls.

According to a still further embodiment, the local loop generation equipment is a doorbell answering system, and the central office is adapted to implement advanced intelligent network (AIN) features. These AIN capabilities permit a premises occupant to receive doorbell answering system telephone calls while already engaged in another telephone call. These AIN capabilities may also be employed to provide a premises occupant with a cancel door bell call waiting feature such that call waiting tones will not be sent to the premises telephone when a visitor activates the doorbell answering system and a call is already in progress. Finally, these AIN capabilities may be used to provide a premises occupant with a call waiting feature such that only calls from the doorbell answering system will cause call waiting tones to be sent to the premises telephone.

BRIEF DESCRIPTION OF THE DRAWING

The foregoing and other objects and advantages of the present invention will become apparent to those skilled in the art upon reading the following detailed description of the preferred embodiments in conjunction with a review of the appended drawings in which:

FIGS. 4A–4D together comprise a flowchart setting forth a first illustrative operational sequence performed by the configuration of FIG. 3.

DETAILED DESCRIPTION OF THE PREFERRED EMBODIMENTS

Figure 1:
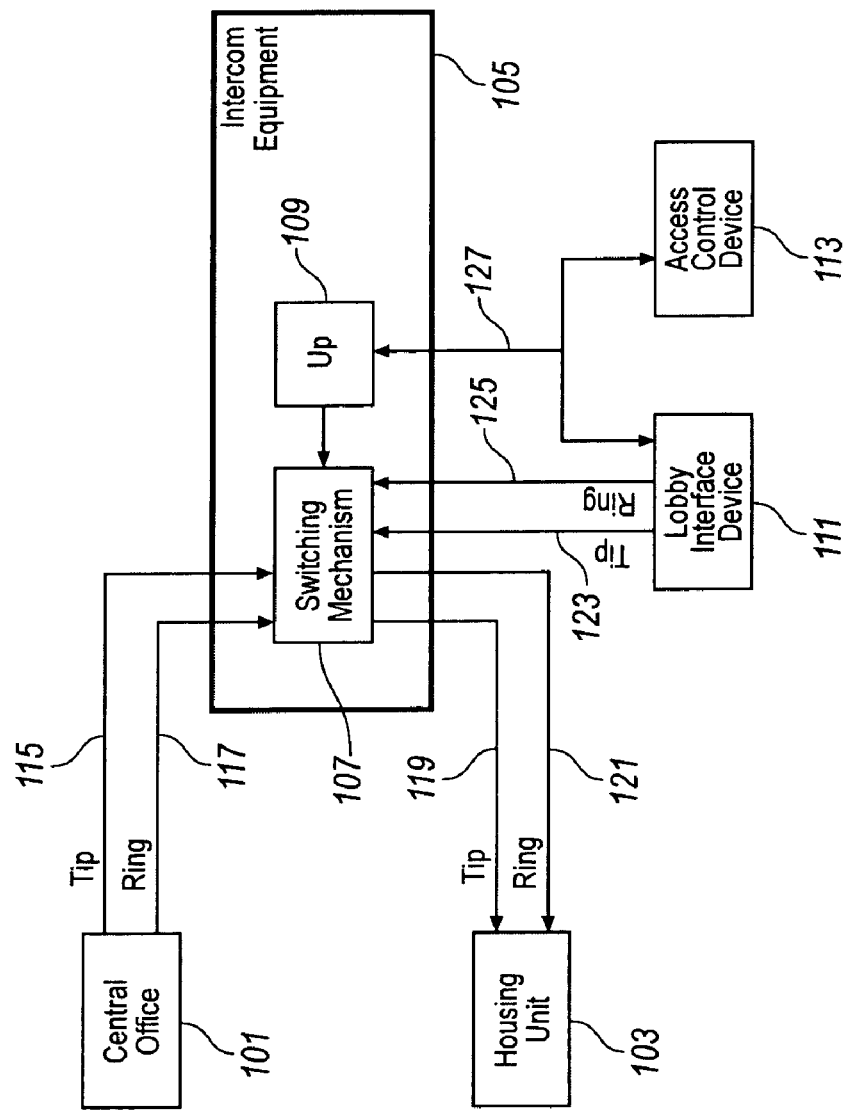
FIG. 1 is an electrical block diagram showing typical prior art interconnections between customers and a central office in an operational environment where local loop generation equipment is employed.
Figure 2:
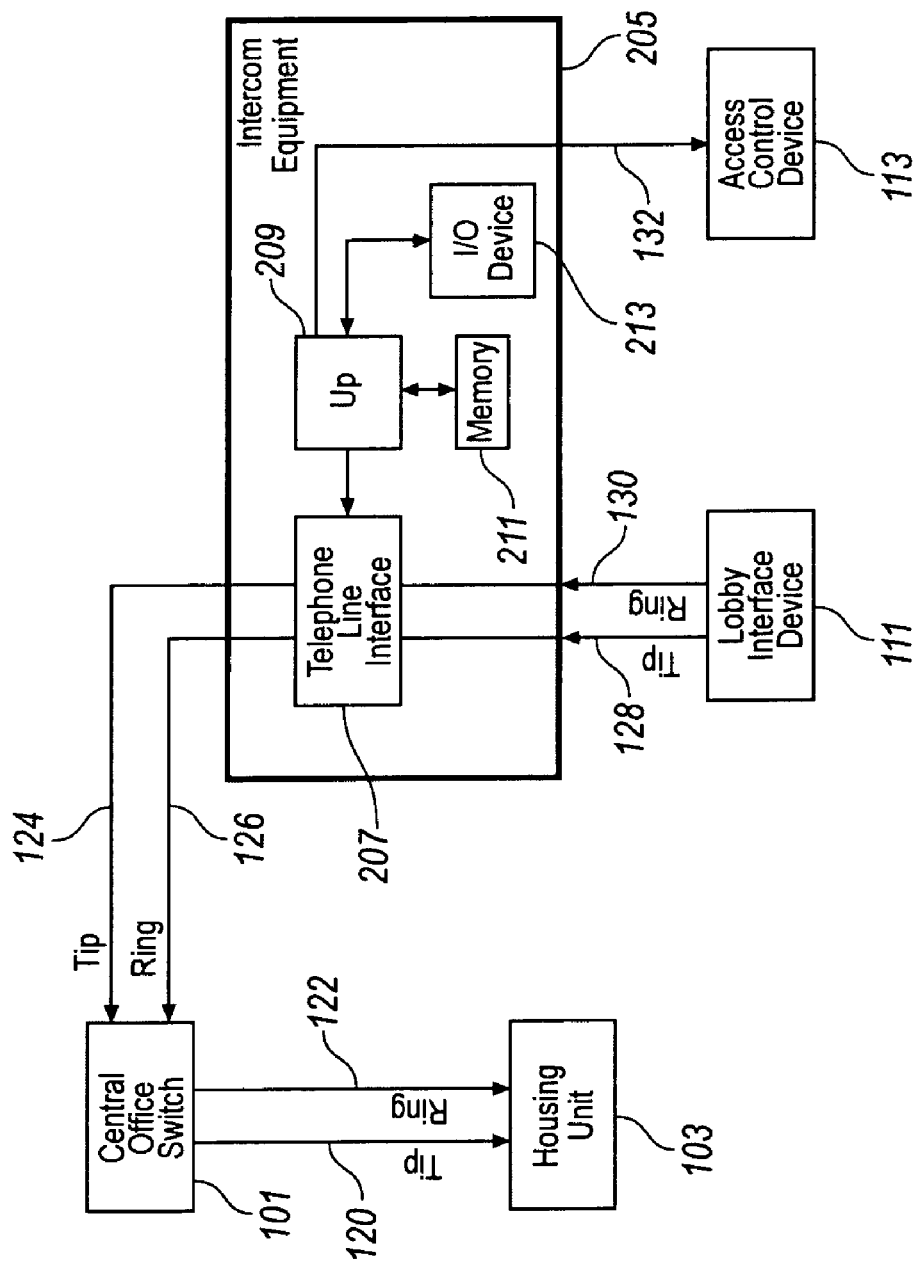
FIG. 2 is an electrical block diagram of a system equipped to provide minimal interruption of communications between a central office and a customer in an operational environment where local loop generation equipment is used.

Refer to FIG. 2 which is an electrical block diagram of a system equipped to provide minimal interruption of communications between a central office and a customer in an operational environment where local loop generation equipment is used. One fundamental distinction between the system of FIG. 2 and the prior art configuration of FIG. 1 is that the system of FIG. 2 does not place intercom equipment 205 in series between central office 101 and housing unit 103. Considering FIG. 2 in greater detail, note that only one housing unit 103 is shown. This is for purposes of illustration only as, in a more typical application, intercom equipment 105 would provide service to a plurality of housing units 103 served by central office 101. Such housing units 103 may, but need not, represent individual apartments, townhouses, condominiums, offices, and/or single family homes which are organized into a larger complex, subdivision, campus, and/or planned unit development. As shown, tip/ring lines 120, 122 run between central office 101 and housing unit 103. Tip/ring lines 124, 126 from central office 101 are coupled to a telephone line interface 207 in intercom equipment 105. Telephone line interface 207 also provides a mechanism for selectively switching respective tip and ring lines 124, 126 to corresponding tip and ring lines 128, 130 serving a lobby interface device 111. This switching mechanism is controlled by a microprocessor 209, operating in conjunction with a memory 211. One or more I/O devices 213 may be utilized to program the microprocessor, to provide commands to the microprocessor, and/or to accept output signals from the microprocessor. The microprocessor 209 also controls the operation of an access control device 113. Examples of access control devices are electronic door locks, solenoid-controlled latches, other types of latching mechanisms, and other programmable-controlled locking and/or enabling mechanisms.

In the configuration of FIG. 2, note that the capability of providing a communications pathway between central office 101 and housing unit 103 exists at all times. This pathway, formed over tip/ring lines 120, 122, exists irrespective of the status of intercom equipment 105. In this manner, digital and/or voice communication between the central office 101 and the housing unit 103 are not subject to being directly interrupted by intercom equipment 205. Communications on tip/ring lines 120, 122 are under the control of central office 101.

When a visitor wishes to notify a person at a selected housing unit 103 of his or her presence, the visitor pushes a button, or presses one or more keys on a keypad at a lobby interface device 111. In response to the receipt of these keypress signals at telephone line interface 207, microprocessor 209 activates telephone line interface 207 to place an outgoing telephone call to central office 101. The microprocessor 209 controls telephone line interface 207 such that the outgoing call includes data uniquely identifying the housing unit 103 for which the visitor wishes to signal his or her presence. This data may, but need not, be specified in the form of a standard DNI (dialed number identifier). Unlike the prior art system of FIG. 1, the connection between the central office 101 and the housing unit 103 is not automatically broken when the visitor activates the lobby interface device 111. Moreover, the system of FIG. 2 does not create a local loop between lobby interface device 111 and housing unit 103.

The outgoing call placed by intercom equipment 205 is received at central office 101. A processing mechanism at the central office 101 uses data associated with this call, such as, for example, the DNI data, to determine what, if any, further action should be taken. This processing mechanism may, but need not, make this determination by referring to a lookup table stored in a memory device at the central office 101. For example, the DNI may be used to place a call to the housing unit 103 specified by the visitor. Certain DNIs may correspond to housing units 103 which do not wish to be disturbed, whereupon the central office 101 will not place a call to the housing unit specified by the visitor, but will instead transmit a prompt message to intercom equipment 205, indicating that this housing unit cannot be signaled from intercom equipment 205. When the central office 101 places a call to a given housing unit 103 in response to a visitor signaling the housing unit from intercom equipment 205, the call may be answered by an occupant at housing unit 103.

Pursuant to a further embodiment of the invention, microprocessor 209 of intercom equipment 205 may be programmed so as to signal to central office 101 the housing unit identification only in the form of an "encoded" dialed number. At the central office 101, AIN capabilities can be utilized to convert the "encoded" housing unit identifier, i.e., the dialed number, into the housing unit's actual phone number. Each of these "encoded" numbers could, but need not, represent a unique combination of DTMF digits that is assigned to a given housing unit. Accordingly, the AIN capabilities are used to map the sequence of DTMF digits entered into intercom equipment 205 by a visitor into an actual telephone number. Since the actual phone numbers of the housing units are resident in an AIN-equipped central office 101 database, and not provided to visitors, this option provides additional security for housing unit residents. This option also preserves the secrecy of unlisted telephone numbers.

If the call is answered, the central office 101 provides a voice communications path between housing unit 103 and intercom equipment 205 so that the visitor can talk with the occupant at housing unit 103. If the occupant wishes to grant the visitor access, the occupant presses a specified DTMF tone sequence on his or her telephone keypad or, alternatively, presses a lock release button separate and apart from the telephone system to grant the visitor access. In cases where the occupant enters a DTMF sequence, the sequence is received at central office 101 and then conveyed to intercom equipment 205. The telephone line interface 207 receives the DTMF sequence, and the microprocessor compares the entered sequence to a sequence stored in memory 211 and corresponding to the occupant's housing unit 103. If the comparison indicates matching DTMF sequences, then the microprocessor 209 causes access control device 113 to grant the visitor access.

Optionally, the central office 101 processing mechanism may be programmed to place a call to a given housing unit 103 only in the absence and/or presence of certain types of communications on tip/ring lines 120, 122. For example, a subscriber at a given housing unit 103 may not wish to be disturbed by a visitor if he is on the Internet, but if the subscriber is engaged in a voice call, he would like to be notified of the existence of the visitor. For each of a plurality of housing units 103, the aforementioned lookup table may be equipped with fields specifying what types of communications on tip/ring lines 120, 122 should, or should not, be interrupted.

The central office 101 may also offer an optional feature whereby, in response to a visitor signaling a given housing unit 103 on intercom equipment 205, the central office will place an outgoing call to that housing unit using call waiting and/or identa-ring (distinctive ringing) features. This feature may also be implemented using a look-up table indicative of whether each of a plurality of housing units 103 subscribes to one or more of the aforementioned features.

Figure 3:
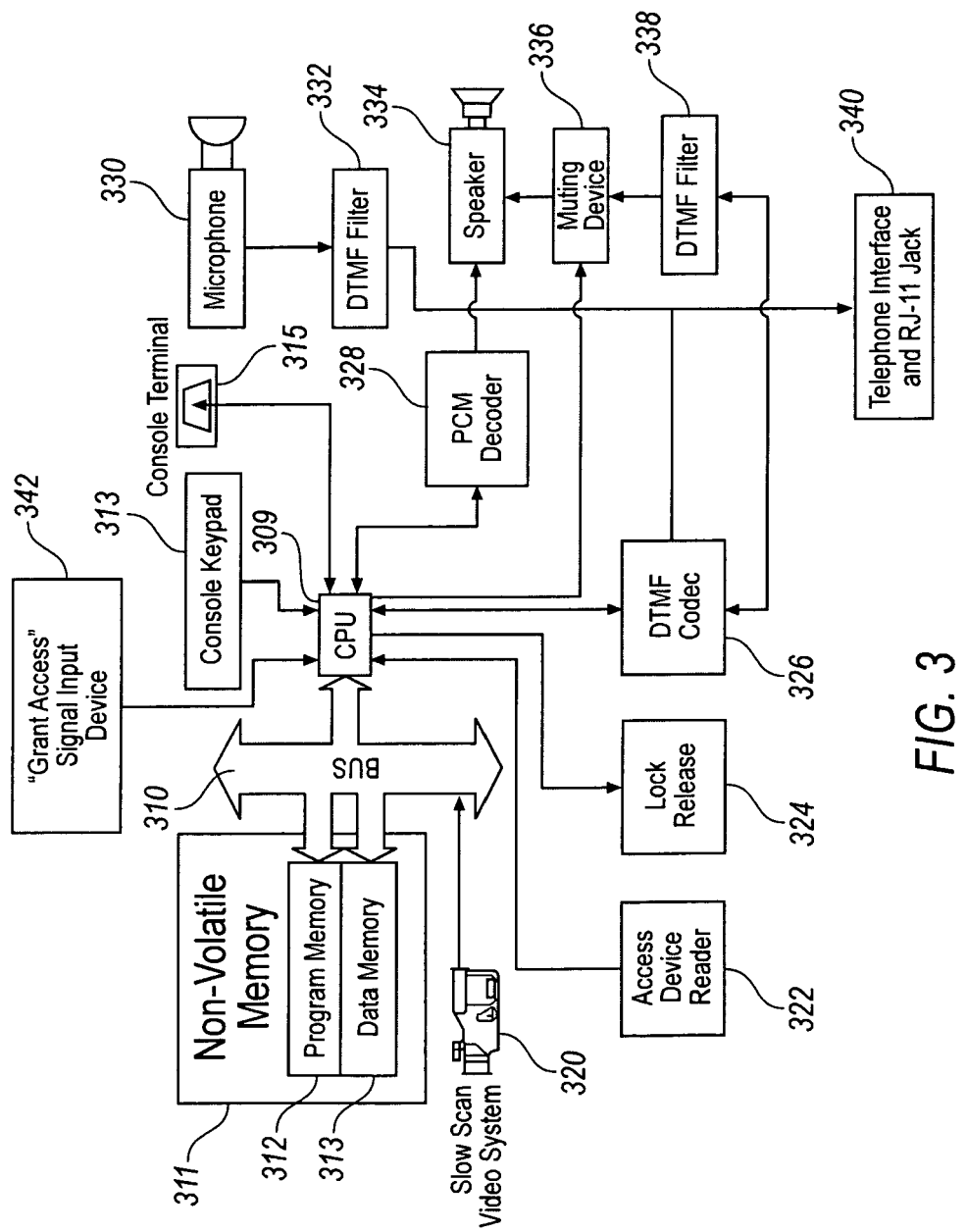
FIG. 3 is a more detailed electrical block diagram of the lobby interface device, intercom equipment, and access control device shown in FIG. 2

FIG. 3 is a more detailed electrical block diagram of the lobby interface device, intercom equipment, and access control device shown in FIG. 2. Note that intercom equipment 205, lobby interface device 111, and access control device 113 are shown as discrete elements in FIG. 2 for purposes of illustration, it being clearly understood that one or more of these elements may be combined. The configuration of FIG. 3 encompasses implementations where discrete elements are employed, as well as other implementations where various elements may be integrated together. Also, the microprocessor 209 of FIG. 2 is also shown for illustrative purposes, it being understood that virtually any processing mechanism could be employed. Whereas the system of FIG. 2 utilized a processing mechanism in the form of microprocessor 209, the system of FIG. 3 sets forth an embodiment which implements this processing mechanism using a central processing unit (CPU) 309.

CPU 309 is coupled to non-volatile memory 311 over a bus 310. Bus 310 is used to connect each of a plurality of peripherals to the CPU 309. However, many peripherals to the CPU 309 may alternatively be connected via dedicated ports on the CPU. As a general matter, devices that require very high throughput are connected to the CPU 309 via bus 310. Such devices include data storage drives and memory. An optional slow-scan video system 320 may also be coupled to bus 310.

Non-volatile memory 311 includes program memory 312 as well as data memory 314. Data memory 314 is used to store information required by an access control program executed by CPU 309. One example of this information includes a database of telephone numbers (FIG. 4, 426) that stores phone number(s) to be dialed by DTMF codec 326 (to be described in greater detail below) when a user at console terminal 315 wishes to signal their presence to a housing unit occupant. Each of these phone numbers is associated with a corresponding code identifier which a console user enters into a console keypad 313 so as to initiate a call to a selected housing unit 103. Data memory 314 is non-volatile, and should be equipped so as to accept updates of information from CPU 309.

A console keypad 313 is coupled to CPU 309, and may, but need not, include an array of switches or buttons. Console keypad 313 could also be implemented using a conventional QWERTY computer keyboard. The only requirement for console keypad 313 is that it provide some mechanism by which a visitor can select and signal a given housing unit. A console terminal 315 is also coupled to CPU 309. Illustrative implementations of console terminal 315 include some type of display device (CRT (cathode-ray tube) monitors, LCD display screens, LED display panels, and/or other mechanisms for indicating and/or displaying information) combined with an input mechanism such as a conventional QWERTY computer keyboard. Console terminal 315 is used to configure the system of FIG. 3 as, for example, by establishing and maintaining one or more data tables. These data tables associate key and/or button presses on the console keypad 313 with housing unit telephone numbers. The interface also allows access to other CPU 309 programmable options such as time-out values for call progress and mute functions. The console terminal 315 can also be used to import new versions of CPU 309 software and changes to PCM decoder 328 prompts. In addition, the console terminal can be used to output diagnostic information such as a request for maintenance.

Microphone 330 is a transducer that accepts acoustical energy input as, for example, from a visitor, and converts this energy into electrical signals. Microphone 330 can be implemented using a microphone of the type employed on telephone handsets. Moreover, if privacy is desired, a telephone handset can be used in lieu of, or in addition to, speaker 334 and microphone 330.

Speaker 334 is a transducer that accepts electrical input signals and converts them into acoustical energy. Speaker 334 can be implemented using a transducer of the type employed in the earpiece of a telephone handset, and/or a speaker of the type found in radios and various other types of electronic devices. Also, the console terminal 315 may employ another speaker for the output of the PCM decoder 328 to ensure that the PCM output is audible at all times. Another illustrative configuration is to have both a speaker and a handset in a cradle. When the handset is removed from its cradle, i.e., placed off-hook, the speaker would then be muted.

For security reasons, it may be desirable to prevent visitors from introducing (by way of microphone 330) and from monitoring (by way of speaker 334) any DTMF tones that may occur on the telephone connection to the central office. Provision of a security mechanism is generally desirable for the following reasons. (1) The housing unit telephone number may be unlisted. If the DTMF tones are audible on the speaker when the console dials the number, a visitor could record and decode this DTMF to reveal the number. (2) The visitor could transmit a sequence of DTMF tones in an attempt to command lock release 324 to open the door latching mechanism. (3) The visitor may attempt to use a DTMF tone generator to place long-distance or toll calls over microphone 330. In the configuration of FIG. 3, a security mechanism is provided in the form of DTMF filter 332, which acts as a filter for microphone 330, and DTMF filter 338/muting device 336, which acts as a filter for speaker 334.

Muting device 336, under the control of CPU 309, is used to activate and deactivate the speaker 334. This device can be used in addition to DTMF filter 338, and/or instead of DTMF filter 338, for securing information. For instance, when the DTMF codec 326 starts dialing a housing unit telephone number, the muting device 336 will disconnect the speaker 334 so that the visitor cannot hear the DTMF signals being sent to the central office 101 (FIG. 1). In the case of the door lock release signal, the CPU 309 could be programmed to activate muting device 336 whenever the muting device detects a DTMF tone, and to deactivate the muting device when a specific DTMF tone is detected, and/or at the end of a specified time period. When the muting device 336 is activated, this means that it attenuates audio signals sent to speaker 334 such that the signals do not generate substantially audible acoustical energy. When the muting device 336 is deactivated, it passes audio signals, substantially unattenuated, from DTMF filter 338 to speaker 334. For example, in actual operation, assume that the door lock release code is a multiple digit DTMF code. The muting device 336 clips the first DTMF tone as the device enters the activated state, and subsequent DTMF digits are inaudible. The muting device 336 becomes deactivated upon reception of the final DTMF digit of the door lock release code, or if the connection between the housing unit 103 (FIG. 1) and the DTMF codec 326 were lost after a timeout of a programmable duration.

If the door lock release signal was, for instance, 6736# (note that 6736 spells out the word OPEN on a telephone keypad), the visitor might hear a very brief portion of a DTMF "6" tone, then the speaker 334 would be muted. After reception of the # signal, the muting device 336 would be deactivated. The use of a multiple digit DTMF door lock release code has security advantages. A multi-digit code renders hacking much more difficult than if a single-digit code were to be employed. Also, the release code is programmable such that, in the event of a successful hacking attempt, the system proprietor can re-program and re-secure the system.

Pulse code modulation (PCM) decoder 328 provides a mechanism for generating audio signals in response to information received from the CPU 309. These audio signals may, but need not, include voice prompts, tones, tone sequences, beeps, and simple melodies. For example, the PCM decoder 328 could be used to output a digitally stored message such as "You may now enter" that is played when a housing unit occupant signals the console to allow the visitor to enter. The PCM decoder 328 could also be used to generate tones, beeps, and/or simple melodies, to indicate positive feedback when keys are depressed, and to indicate that the door latching mechanism is released. Illustrative conditions for which PCM decoder 328 is used to provide audio signals are as follows: (1) so as to provide positive audio feedback when a user presses a key on console terminal 315 and/or console keypad 313; (2) to provide messages to a visitor at console keypad 313 indicating current system status, such as "please wait", "we are contacting the occupant of the housing unit now"; "you may now enter"; and "for deliveries, please contact the Superintendent". Many of these prompts may be activated by call progress detection logic in telephone interface 340. For instance, a "busy" signal is indicative that a housing unit occupant does not wish to be disturbed, and would trigger the playback of an appropriate voice message.

CPU 309 controls the operation of a lock release mechanism 324, a DTMF coder-decoder (codec) 326, and an access device reader 322. The DTMF codec 326 is used to initiate phone calls and to decipher touch tones sent by the housing unit occupant to the intercom equipment 205 (FIG. 2). The lock release 324 can be implemented, for example, using a dry contact switch. The state of the contacts of this switch (open or closed) is under the control of the CPU 309. In typical system applications, house current is used as a power source, such that the contacts should be equipped to handle voltages up to at least 120 VAC. However, it is alternatively possible to use other power sources, whereupon appropriate contact ratings should be employed. In many system applications, the contacts are normally open, and are placed in the closed state when the door latch is released.

The access device reader 322 may be implemented using any of a variety of devices including, for example, a smart card reader, a magnetic card swipe reader, a bar code reader, a simple contact closure, a data input device, a proximity card reader, and/or an RF transponder. An example of a simple contact closure would be a key-operated switch. A key is inserted into a tumbler and, when turned, closes a set of contacts that sends an interrupt signal to the CPU 309. In response to this interrupt signal, the CPU 309 is programmed to activate the door lock release 324 to permit the door to be opened.

A more sophisticated implementation of access device reader 322 involves a reader device such as a magnetic card reader or a transponder receiver. In this implementation, data from the reader device is sent to CPU 309 which verifies the data against a verification database stored in data memory 314 and releases the door lock release 324 mechanism if the data from the reader device is valid.

Slow-scan video system 320 provides a mechanism for sending video information acquired by a camera in the vicinity of an access door to a remote location. This remote location can be a housing unit 103 and/or other security checkpoint. In the case of a housing unit 103, the occupant would most likely be equipped with a video-capable modem. Alternatively, dedicated coaxial cable lines could be provided from the camera to one or more housing units. In the case of a video-capable modem, the DTMF codec 326 and telephone interface 340 could be combined into a modem device that supports simultaneous voice and data. This would allow slow scan video to move over a conventional tip-ring telephone line for decoding and display in the housing unit 103. The slow-scan video system 320 may, but need not, be equipped to capture one or more digital images. Having slow scan digital image capture capability could be particularly useful if combined with one-button 911 dialing. Depressing the 911 emergency key could be used to trigger the capture of image data that would assist law enforcement personnel.

Telephone interface 340 provides FCC (Federal Communications Commission) compliance to Part 95 and Part 86 of FCC Rules and Regulations. Interface 340 also provides call progress functions and monitoring. Illustrative call progress functions are on-hook, off-hook, ring detect, dial tone detect, busy detect, and call completion. Telephone interface 340 may also provide one or more standard RJ-11 jack connections.

Before power is first applied to the system of FIG. 3, or when power to one or more devices of FIG. 3 is restored after a power failure, the devices shown in FIG. 3 should be placed in the following states as part of an initialization process. The telephone interface 340 should be in the on-hook state, and the lock release 324 should be "open". In this context, "open" means that the circuit to the lock release 324 mechanism is incomplete and, therefore, the lock is not released, but remains in the locked position. Upon application of power, the CPU 309 initializes other devices as follows. The CPU 309 first loads a copy of the operating system from program memory 312, along with current copies of a console terminal interface program and an application program. The CPU 309 downloads a button/telephone table from data memory 314, and also downloads program parameters such as time-outs. Variable space in data memory 314 is initialized to zero. The lock release 324 is open-circuit (locked—door secure), and the DTMF codec 326 is set to decode incoming DTMF signals. The console keypad 313 is "read", the PCM decoder 328 is set to "silent", the microphone 330 is "read", the speaker 334 is set to "silent", the muting device 336 is turned off, and the telephone interface 340 is set on-hook.

The CPU 309 automatically starts the current version of the application software at the time of startup. At about the same time, a process to provide a supervisory interface is started and attached to the console terminal 315 interface. The process could either use a multi-tasking operating system or a simple foreground/background program. As part of the application startup, the program should access telephone interface 340 and place it in the off-hook condition so as to wait for detection of dial tone. If, after an appropriate time period, no dial tone is detected, the CPU 309 uses the PCM decoder 328 to output an appropriate error message to speaker 334. If this is the first time that the system of FIG. 3 has been used, then the supervisory interface program will be required to accept input parameters and table values that map console keypad 313 buttons to appropriate telephone numbers.

When a visitor wishes to call an occupant of a housing unit 103 (FIG. 2), they approach console keypad 313 and examine labels next to the keypad 313 to identify and depress one or more buttons corresponding to the housing unit they wish to contact. These depressed buttons are read by the application program running on CPU 309 (FIG. 3). The value(s) read by the CPU 309 are then used as key value(s) for indexing a lookup table of telephone numbers. If the table entry corresponding to the read key value(s) is empty, then an appropriate PCM-encoded message is outputted to the speaker 334 (i.e., "this tenant does not accept visitors"). If there is a phone number associated with the read key value(s), then the steps outlined in FIGS. 4A–4D are performed.

FIGS. 4A–4D together comprise a flowchart setting forth an illustrative operational sequence performed by the configuration of FIG. 3. The program commences at block 401 where a visitor presses one or more keys on console keypad 313 (FIG. 3) to notify a selected occupant premises (i.e., a housing unit 103) of the visitor's presence. At block 403, the CPU 309 searches the lookup table of telephone numbers to retrieve a database entry corresponding to the key or keys pressed by the visitor. Does the CPU retrieve a database entry? If not, the program goes to block 407 where the CPU triggers the outputting of an error message to PCM decoder 328 and speaker 334 (FIG. 3). The program then loops back to block 401.

The affirmative branch from block 403 leads to block 405 where the CPU signals DTMF codec 326 (FIG. 3) to dial the telephone number specified by the lookup table of telephone numbers. At block 409, the DTMF codec places a telephone call over a dedicated answering service telephone line (tip line 124 and ring line 126 of FIG. 2) to the central switching office 101 (FIG. 2). The central office receives the call from the DTMF codec and uses the DNI (dialed number identifier) of the received call to place an outgoing call to the occupant premises (i.e., housing unit 103 of FIG. 2), optionally using call waiting and/or identa-ring (distinctive ringing) features (FIG. 4B, block 411). At block 413, an individual at the occupant premises answers the call placed by the central office and can communicate with the visitor via the speaker 334 (FIG. 3) and/or microphone 330 (FIG. 3).

An individual at the occupant premises may, if desired, grant the visitor access (block 415) by pressing a predetermined DTMF key or keys on the telephone device used to answer the call at block 413. However, note that an alternate or additional mechanism for access control may be provided in the form of a separate signalling facility as, for example, a pair of wires used to close a contact, thereby releasing the door lock. This separate signalling facility is shown in FIG. 3 as a "grant access" signal input device 342 that is coupled to CPU 309. The DTMF codec receives the DTMF tone(s) entered at block 415 and forwards the decoded tone(s) to the CPU (block 417). The CPU compares the decoded tone(s) with access code(s) stored in non-volatile memory (block 419). Do the coded tones match any access code(s) stored in memory? If not, the program advances to block 424 where the CPU and the codec send an error message to the telephone device used to answer the call at block 413. The program then loops back to block 415.

The affirmative branch from block 419 leads to block 421 where the CPU activates the lock release mechanism, thereby providing the visitor with access. The CPU then instructs the codec to place the telephone interface on-hook (block 423) and the operational sequence of FIGS. 4A–4D terminates.

Figure 5:
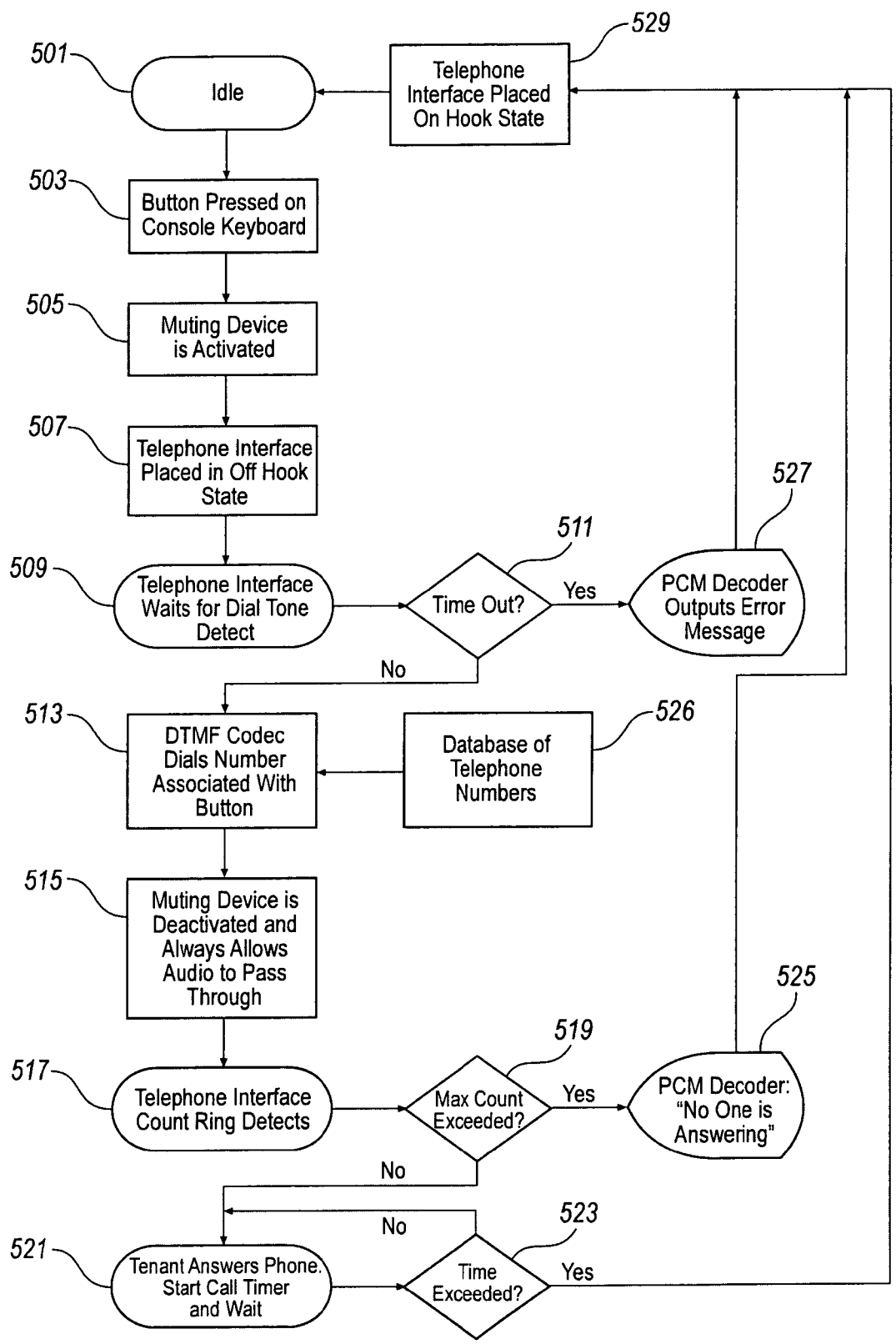
FIG. 5 is a flowchart setting forth a second illustrative operational sequence performed by the configuration of FIG. 3.

FIG. 5 is a flowchart setting forth a second illustrative operational sequence performed by the configuration of FIG. 3. The operational sequence commences at block 501 where CPU 309 (FIG. 3) is in an idle state until a button on console keypad 313 (FIG. 3) is pressed (FIG. 5, block 503). Once the button is pressed, at block 505, the CPU activates the muting device (FIG. 3, 336). The telephone interface (FIG. 3, 340) is placed in an off-hook state (block 507), and the telephone interface then waits for a dial tone to be detected (block 509). If dial tone is not detected within a specified time-out period (block 511), the PCM decoder 328 (FIG. 3) outputs an error message (block 527), the telephone interface is placed in an on-hook state (block 529) and the program loops back to block 501.

If dial tone is detected within the time-out period (block 511), the program advances to block 513 where the DTMF codec (FIG. 3, 326) dials the number associated with the button(s) pressed at block 503. The CPU instructs the codec to dial the appropriate number by referring to a database of telephone numbers stored in memory (block 526). The muting device is then deactivated, allowing audio to pass through (block 515). The telephone interface counts ring detects (block 517), and performs a test to ascertain whether or not a specified maximum number of ring counts have been exceeded (block 519). If the maximum number of ring counts have been exceeded, the program advances to block 525 where the PCM decoder plays out a message "No one is answering the telephone", and the program then loops back to block 529. If the maximum number of ring counts has not been exceeded, the program advances to block 521 where the call is answered by someone at the occupant premises. A call timer is started to time the duration of the answered call. If the time duration of the answered call exceeds a specified duration, the program loops back to block 529.

Figure 6:
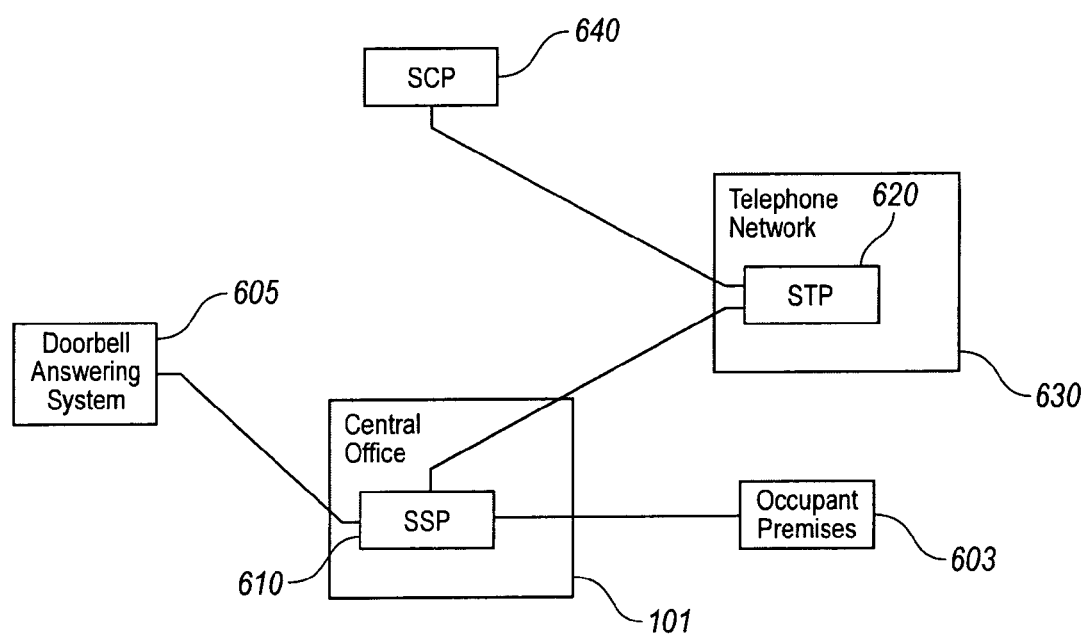
FIG. 6 is a hardware block diagram of a system equipped to provide minimal interruption of communications between a central office and a customer in an operational environment where the central office utilizes advanced intelligent network (AIN) protocols.

FIG. 6 is a hardware block diagram of a system equipped to provide minimal interruption of communications between a central office and a customer in an operational environment where the central office utilizes advanced intelligent network (AIN) protocols. Conceptually, this illustrative embodiment utilizes local loop generation equipment in the form of a doorbell answering system. This embodiment uses AIN capabilities so as to allow a premises occupant to receive doorbell answering system telephone calls while already engaged in another telephone call. These AIN capabilities may also be employed to provide a premises occupant with a cancel door bell call waiting feature such that call waiting tones will not be sent to the premises telephone when a visitor activates the doorbell answering system and a call is already in progress. Finally, these AIN capabilities may be used to provide a premises occupant with a call waiting feature such that only calls from the doorbell answering system will cause call waiting tones to be sent to the premises telephone.

Pursuant to the aforementioned AIN capabilities, central office 101 (FIG. 6) is equipped with an AIN (advanced intelligent network) services signaling point (SSP) 610. In practice, the SSP 610 may be implemented using AIN software executed by a processing mechanism at the central office 101. An example of suitable AIN software is developed on a system generally known as the Integrated Service Control Point (ISCP)™. The SSP 610 is coupled to one or more signaling transfer points (STP) 620 and a service control point (SCP) 640. The STP 620 and/or the SCP 640 may, but need not, be part of telephone network 630. The STP 620 forwards queries from the central office SSP 610 to the service control point (SCP) 640. Although FIG. 6 shows one signaling transfer point (STP) 620, this is for convenience, as any number of STPs 620 may be present. The signaling transfer point(s) (STP) 620 are also utilized for the purpose of transferring response messages from the service control point (SCP) 640 to the central office 101. Examples of queries include requests for call originator identity and requests for called number identity. These queries may also include standard OHD-type messages of the type well-known to those skilled in the art. Response messages instruct the SSP 610 at the central office 101 to take a certain action as, for example, to route the call to a telephone number based upon the receipt of a query message from the SSP 610.

In the context of the aforementioned AIN embodiment, an illustrative operational sequence may proceed as follows. First, a customer (the visitor) dials into the central office and accesses the AIN SSP. The SSP then queries the SCP with a standard TCAP message of the type well-known to those skilled in the art. The SCP performs logic to determine if the residence specified by the customer in the standard TCAP message wants to receive a ringing signal when a visitor activates the doorbell answering system and, if so, what type of ringing signal (i.e., distinctive ringing) is to be provided. The SCP responds back to the SSP with instructions to route the call to a number corresponding to the residence specified by the customer and ring the residence phone with a distinctive ringing signal. Finally, the call is routed to the residence with the distinctive ringing signal. The AIN SSP monitors the duration of the call (if answered), and disconnects the call after a specified duration of, say, 120 seconds. A more specific operational sequence is presented in FIGS. 7A and 7B.

Figure 7A:
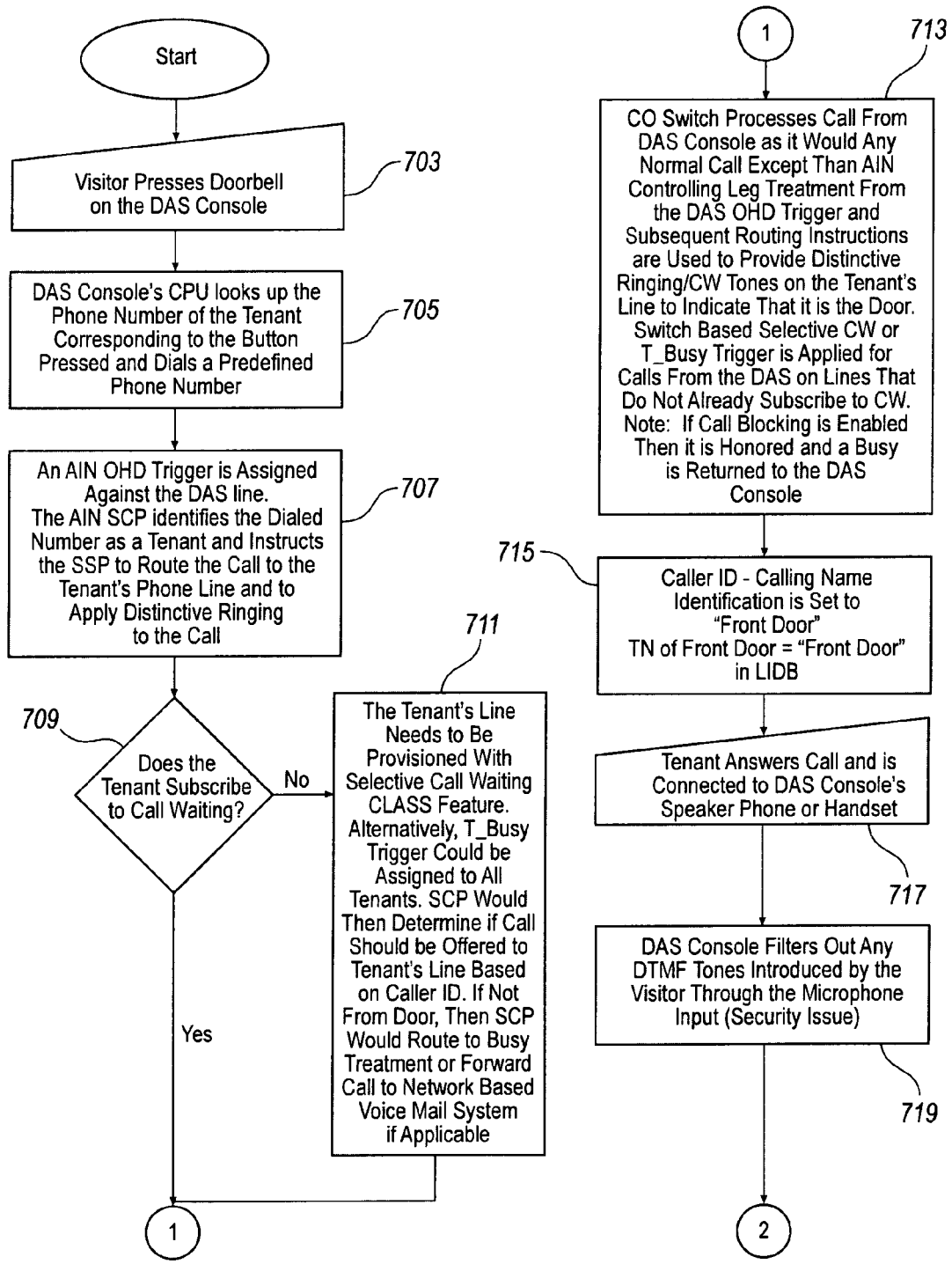
FIGS. 7A and 7B together comprise a flowchart setting forth an illustrative operational sequence performed by the configuration of FIG. 6.
Figure 7B:
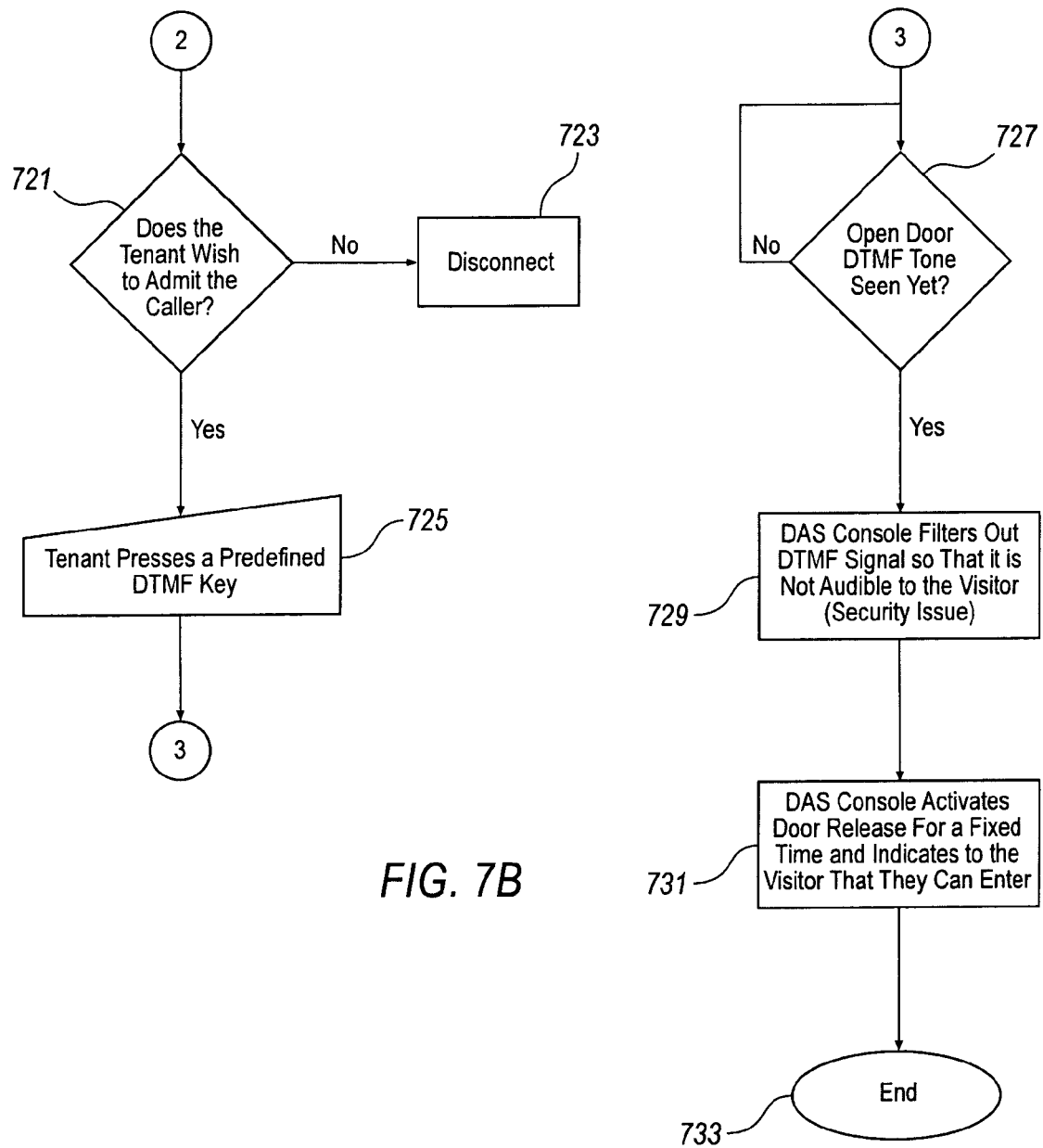

FIGS. 7A and 7B together comprise a flowchart setting forth an illustrative operational sequence performed by the configuration of FIG. 6. The sequence commences at block 701. At block 703, the visitor presses a doorbell button provided by the doorbell answering system (DAS) (FIG. 6, 605) console. The doorbell answering system CPU (FIG. 3, 309) looks up the telephone number of the tenant corresponding to the button pressed and dials a predefined telephone number (block 705) over tip/ring lines 124, 126 (FIG. 2). Next (block 707), the AIN-equipped central office 101 (FIG. 6) assigns an OHD trigger against the doorbell answering system line that includes tip/ring lines 124, 126 (FIG. 2). The SCP 640 (FIG. 6) identifies the dialed number as a tenant and instructs the SSP 610 (FIG. 6) to route the call to the tenant's telephone line (tip/ring lines 120, 122 of FIG. 2), and optionally to apply distinctive ringing to that call.

A test is implemented at block 709 to ascertain whether or not the tenant subscribes to call waiting. If not, the program advances to block 711 where the tenant's line should be provisioned with selective call waiting, generally known to those skilled in the art as the "CLASS" feature. In this manner, only calls from the doorbell answering system will initiate the call waiting function. Alternatively, a T_Busy trigger could be assigned to all tenants. The SCP 640 (FIG. 6) would then determine if the central office should offer a call to the tenant's telephone line based on caller ID. If an incoming call is not from the doorbell answering system, the SCP would route the call to busy treatment or forward the call to a network-based voice mail system, for example. The program then advances to block 713.

The operations of block 713 are performed if the affirmative branch from block 709 is followed or, alternatively, after the operations of block 711 have been performed. At block 713, the central office processes incoming calls from the doorbell answering system as it would any other incoming call, except that the AIN controlling leg treatment from the doorbell answering system OHD trigger, as well as subsequent routing instructions, are used to provide distinctive ringing and/or call waiting (CW) tones on the tenant's line. This distinctive ringing and/or CW tones are used to indicate that an incoming call to the tenant is from the doorbell answering system. Central office switch-based selective CW or T_Busy triggers are applied to calls from the doorbell answering system to tenants that do not already subscribe to call waiting. However, if the tenant has enabled call blocking, the central office honors this enablement, and a Busy signal is returned to the doorbell answering system over tip/ring lines 124, 126 (FIG. 2).

At block 715, a caller ID—calling name identification is sent to the access door controlled by the doorbell answering system. The tenant answers the call (block 717) and is connected to the doorbell answering system's speaker 334 and/or microphone 330 (FIG. 3). The doorbell answering system filters out any DTMF tones introduced by the visitor through the microphone input (as discussed previously in conjunction with FIG. 3).

At blocks 721 and 725, the tenant indicates whether or not he wishes to admit the visitor (caller) by pressing a predefined DTMF key. If the tenant does not wish to admit the visitor, the call is disconnected (block 723). If the tenant does wish to admit the caller, the program advances to block 727 where the doorbell answering system awaits the arrival of an "open door" DTMF tone sequence. Once the sequence is received (block 729), DTMF filter 338 (FIG. 3) filters out the DTMF "open door" sequence so that it is not audible to the visitor. The doorbell answering system then activates the lock release 324 (FIG. 3) for a fixed time and indicates to the visitor that he or she can enter. The

We claim:

1. An apparatus for minimizing interruption of communications on a first communications link between a central office and a customer premises telephonic device in response to activation of local loop generation equipment, the apparatus comprising:
   (a) a second communications link between the local loop generation equipment and the central office;
   (b) a processing mechanism at the central office coupled to the second communications link and adapted to determine under what circumstances the customer premises telephonic device will be notified over the first communications link in response to the activation of local loop generation equipment.

2. The apparatus of claim 1 wherein the second communications link is provided in the form of a telephone line which is equipped to place outgoing local calls, but not equipped to receive incoming calls, and not equipped to place long-distance calls.

3. The apparatus of claim 1 wherein the local loop generation equipment is a doorbell answering system.

4. The apparatus of claim 1 wherein the central office utilizes advanced intelligent network (AIN) protocols adapted to permit a premises occupant to receive doorbell answering system telephone calls on the first communications link while already engaged in another telephone call on the first communication link.

5. The apparatus of claim 4 wherein the AIN capabilities are adapted to provide a premises occupant with a cancel door bell call waiting feature such that the central office will not send call waiting tones on the first communications link when a visitor activates the doorbell answering system and a call is already in progress.

6. The apparatus of claim 4 wherein the AIN capabilities are used to provide a premises occupant with a call waiting feature such that only calls from the doorbell answering system will cause call waiting tones to be sent on the first communications link.

7. An apparatus for intelligently controlling any interruption of communications over a first telephone line between a central office and one or more customer premises devices caused by the activation of local loop generation equipment on the first telephone line the apparatus comprising:
   (a) a second telephone line between the local loop generation equipment and the central office;
   (b) a processing mechanism at the central office coupled to the second telephone line and adapted to determine under what circumstances the customer premises telephonic device will be notified over the first telephone line in response to the activation of local loop generation equipment.

8. The apparatus of claim 7 wherein the second telephone line is equipped to place outgoing local calls, but not equipped to receive incoming calls, and not equipped to place long-distance calls.

9. The apparatus of claim 7 wherein the local loop generation equipment is a doorbell answering system.

10. The apparatus of claim 7 wherein the central office utilizes advanced intelligent network (AIN) protocols adapted to permit a premises occupant to receive doorbell answering system telephone calls on the first telephone line while already engaged in another telephone call on the first telephone line.

11. The apparatus of claim 10 wherein the AIN capabilities are adapted to provide a premises occupant with a cancel door bell call waiting feature such that call waiting tones will not be sent on the first telephone line when a visitor activates the doorbell answering system and a call is already in progress.

12. The apparatus of claim 10 wherein the AIN capabilities are used to provide a premises occupant with a call waiting feature such that only calls from the doorbell answering system will cause call waiting tones to be sent on the first telephone line.

13. An apparatus for allowing a premises occupant to receive an incoming telephone call placed from a doorbell answering system on a first telephone line while the first telephone line is already in communication with a central office and the premises occupant is engaged in a telephone call on the first telephone line, the apparatus comprising:
   (a) a second telephone line between the doorbell answering system and the central office;
   (b) a processing mechanism at the central office coupled to the second telephone line and adapted to determine under what circumstances the customer premises occupant will be notified over the first telephone line in response to the activation of the doorbell answering system.

14. The apparatus of claim 13 wherein the processing mechanism further comprises a mechanism for providing the customer premises occupant with a door bell call waiting feature such that the central office will send call waiting tones over the first telephone line when a visitor activates the doorbell answering system and the customer premises occupant is already engaged in a telephone call on the first telephone line.

15. The apparatus of claim 13 wherein the processing mechanism further comprises a mechanism for providing the customer premises occupant with a cancel door bell call waiting feature such that the central office will not send call waiting tones over the first telephone line when a visitor activates the doorbell answering system and the customer premises occupant is already engaged in a telephone call on the first telephone line.

16. The apparatus of claim 13 wherein the processing mechanism further comprises a mechanism for providing the customer premises occupant with a door bell call waiting feature such that the central office will send call waiting tones over the first telephone line only when a visitor activates the doorbell answering system and the customer premises occupant is already engaged in a telephone call on the first telephone line.

17. The apparatus of claim 13 wherein the second telephone line is equipped to place outgoing local calls, but not equipped to receive incoming calls, and not equipped to place long-distance calls.

18. A method for minimizing interruption of communications on a first communications link between a central office and a customer premises telephonic device in response to activation of local loop generation equipment, the method comprising the steps of:
(a) providing a second communications link between the local loop generation equipment and the central office;
(b) utilizing a processing mechanism at the central office, coupled to the second communications link, for determining under what circumstances the customer premises telephonic device will be notified over the first communications link in response to the activation of local loop generation equipment.

19. A method for intelligently controlling any interruption of communications over a first telephone line between a central office and one or more customer premises devices caused by the activation of local loop generation equipment on the first telephone line, the method comprising the steps of:
(a) providing a second telephone line between the local loop generation equipment and the central office;
(b) utilizing a processing mechanism at the central office, coupled to the second telephone line, for determining under what circumstances the customer premises telephonic device will be notified over the first telephone line in response to the activation of local loop generation equipment.

20. A method for allowing a premises occupant to receive an incoming telephone call placed from a doorbell answering system on a first telephone line while the first telephone line is already in communication with a central office and the premises occupant is engaged in a telephone call on the first telephone line, the method comprising the steps of:
(a) providing a second telephone line between the doorbell answering system and the central office;
(b) providing a processing mechanism at the central office, coupled to the second telephone line, for determining under what circumstances the customer premises occupant will be notified over the first telephone line in response to the activation of the doorbell answering system.

21. A method for controlling visitor access to an occupant premises, the method comprising the steps of:
(a) using a phone dialing mechanism to place a telephone call;
(b) the telephone call causing a notification to be provided from a central office to a telephonic device at the occupant premises, the notification signifying that a visitor is present;
(c) an automated voice enunciation mechanism providing an enunciated voice message to the visitor indicative of progress of the telephone call and corresponding to at least one of busy signal, dial tone, and an answered call;
d) when the telephone call is answered, providing a communications path between the visitor and the occupant premises so as to enable an occupant to determine whether or not to grant access to the visitor; and
e) activating an access control mechanism at the occupant premises if access is to be provided to the visitor.

22. The method of claim 21 wherein the communications path is provided using a slow scan video link.

23. The method of claim 22 wherein the slow scan video link is implemented using modems.

24. A system for controlling visitor access to an occupant premises, the system comprising:
(a) a phone dialing mechanism adapted to place a telephone call;
(b) a notification mechanism responsive to the phone dialing mechanism to cause a notification to be provided from a central office to a telephonic device at the occupant premises, the notification signifying that a visitor is present;
(c) an automated voice enunciation mechanism adapted to provide an enunciated voice message to the visitor indicative of progress of the telephone call and corresponding to at least one of busy signal, dial tone, and an answered call;
(d) a communications path establishment mechanism operative, when the telephone call is answered, so as to provide a communications path between the visitor and the occupant premises, thereby enabling an occupant to determine whether or not to grant access to the visitor; and
(e) an access control mechanism at the occupant premises adapted to be activated if access is to be provided to the visitor.

25. The system of claim 24 wherein the communications path is provided using a slow scan video link.

26. The system of claim 25 wherein the slow scan video link is implemented using modems.

27. A system for providing selective access to an occupant premises, including:
(a) a first translation mechanism for translating telephone signalling tones into voice;
(b) a second translation mechanism for detecting a call status and translating the call status into one or more enunciated voice prompts using stored digital voice representations;
(c) an association mechanism for associating an occupant premises identifier with an occupant premises telephone number and a door answering device telephone number, so as to enable signalling of an occupant premises by placing a telephone call over the public switched telephone network to the door answering device telephone number.

* * * * *